United States Patent [19]

D'Alessio et al.

[11] Patent Number: 5,170,426

[45] Date of Patent: Dec. 8, 1992

[54] METHOD AND SYSTEM FOR HOME INCARCERATION

[75] Inventors: Frederick D. D'Alessio, Great Falls, Va.; Alfred C. Keoppe, Pennington, N.J.; Mark A. Wegleitner, Arlington, Va.; Alexander I. McAllister, Wheaton, Md.

[73] Assignee: Bell Atlantic Network Services, Inc., Arlington, Va.

[21] Appl. No.: 758,051

[22] Filed: Sep. 12, 1991

[51] Int. Cl.⁵ ............... H04M 11/04; G08B 23/00; G08B 26/00
[52] U.S. Cl. ........................... 379/38; 379/49; 340/573; 340/505; 340/539
[58] Field of Search .......... 379/38, 42, 49, 50, 379/106, 142; 340/505, 539, 573, 592, 825.08, 825.34, 825.36, 825.49; 381/42; 382/2-4

[56] References Cited

U.S. PATENT DOCUMENTS

| | | |
|---|---|---|
| 3,896,266 | 7/1975 | Waterbury . |
| 4,481,384 | 11/1984 | Matthews . |
| 4,742,537 | 5/1988 | Jesurum . |
| 4,743,892 | 5/1988 | Zayle ............................. 379/38 |
| 4,747,120 | 5/1988 | Foley ............................ 379/38 |
| 4,843,377 | 6/1989 | Fuller et al. ..................... 379/38 |
| 4,916,435 | 4/1990 | Fuller ............................ 379/38 |
| 4,918,432 | 4/1990 | Pauley et al. ..................... 379/38 |
| 4,924,211 | 5/1990 | Davies ........................... 379/38 |
| 5,023,901 | 6/1991 | Sloan et al. ..................... 379/38 |
| 5,054,055 | 10/1991 | Hanle et al. ..................... 379/142 |

Primary Examiner—James L. Dwyer
Assistant Examiner—Wing F. Chan
Attorney, Agent, or Firm—Lowe, Price, LeBlanc & Becker

[57] ABSTRACT

A method and system is disclosed for remotely verifying attendance of a particular person at a predetermined confined area. Monitoring and verification is performed through a telephone network including a telephone on the premises of the location of confinement and a control center. Voice verification, using voice analysis of speech transmitted in a telephone call from the site to the center is performed during periodic testing. A voice template vocabulary is established for the individual and used for voice verification. Caller line identification of each incoming call is performed to verify that call originates from the appropriate location. The confined individual is required, either randomly or at scheduled intervals, by the system to call the control center and recite a statement including randomly selected words from the template vocabulary.

27 Claims, 5 Drawing Sheets

METHOD AND SYSTEM FOR HOME INCARCERATION

TECHNICAL FIELD

The present invention relates to remote verification of the presence of a particular individual within a predetermined confinement area, broadly described as a home incarceration system. More particularly, the invention is directed to a method and system for remotely confirming that the individual is at the prescribed premises by communicating with the individual via a telephone network, identifying the location by utilizing caller line identification and identifying the individual by voice identification speech processing.

BACKGROUND ART

The concept of home incarceration has evolved as an alternative to detention in government jail and prison facilities. In cases of relatively light infractions, offenders, rather than being placed as inmates in overcrowded facilities, are confined to predetermined limited geographical areas including, for example, homes and workplaces. The burden on the prison system is relieved by enabling more space for criminals convicted of more serious crimes. Cost efficiency is also a significant factor as the expense of incarceration in such a facility is quite high. The degree of severity of punishment and the prospects of rehabilitation of the light offender are more appropriate to a home incarceration environment than in a prison provided for felons.

In a "house arrest" situation, the detainees, of course, are more likely to interact with the community. Public security is a socially sensitive issue and it is important that the activities of captives be monitored and supervised. The whereabouts and identity of individuals should be capable of being established at any time without the necessity of assignment of a law enforcement officer for constant surveillance on a one to one basis.

A prior art monitoring arrangement is shown in FIG. 1. A bracelet 20 is worn on the wrist or ankle of the detainee. A radio transmitter 22 broadcasts a coded signal which is received at a base 24. The base may be stationary or mobile. Verification of the received coded signal is performed at the base as indicated in block 26. Inasmuch as the signal has a limited range, reception of the signal at the base is indicative that the bracelet, and presumably the detainee, is within the defined area of confinement. The signal may be continuously or selectively generated.

The base is under the control of a processor through a telephone line 30. The processor may be part of a local area network including a file server 32 having data base information of all detainees in the system. At any time the system may call, via the telephone, the confinement site and ask for verification. Telephone calls may be made randomly or at scheduled intervals determined by the system. If the signal is to be continuous and the base senses an interruption in the signal, the system will initiate a call for verification.

During a call, the detainee is requested to position the bracelet appropriately near the transmitter. The transmitter then picks up the code from the bracelet and transmits it back to the base. If the transmitter is beyond the range of the base, or if the code is not verified, the base can initiate a call to the system processor to indicate that the detainee is not responding or has not been verified.

A similar prior art arrangement is disclosed in U.S. Pat. No. 4,747,120. A bracelet capable of generating a coded signal is worn by the person to be monitored. A decoder, connected with a telephone, can decode the signal when the bracelet is appropriately positioned adjacent the decoder and the decoded signal can be transmitted over the telephone network to the remote system.

The above described arrangements, intended for selective or continuous personnel monitoring, have inherent disadvantages. In the prior art embodiment of FIG. 1, lengthy interruptions in signal transmission can be caused by various sources of interference. As a result, the base may give frequent false indications of non-verification, requiring human intervention. Where the coded signal is transmitted by the phone line, rather than by radio transmission, continuous monitoring is impractical, as an on line connection must be continuously maintained for each person monitored.

A phone call by the system to the confinement site for purposes of verification will not be productive during periods in which radio transmission is interrupted by interference. As a backup for such instances, monitoring personnel may attempt to identify the voice of the called party during the telephone conversation. The listener would be required either to know the confinee personally or be familiar with voice recordings of the individual to be verified. Such identification attempts likely would not be successful if the system serves a large number of detainees or if the speech of the called party is slurred by the influence of drug or alcohol abuse. Enforcement personnel frequently must be dispatched to the confinement sites to resolve the issue.

A further drawback of these systems is that the coded signal may be verified without complete assurance that the signal emanates from the location of confinement. In the case of radio transmission to the base, while the transmission range may be limited, the range may nevertheless extend beyond the bounds of confinement. In the case of telephone transmission, the system may be thwarted by placement of a decoder at a telephone, which is provided with call forward service, in an unauthorized area. A call placed by the system to the site of incarceration could be call forwarded to the unauthorized area and the code would be verified, falsely indicating that the detainee is identified and present at the appropriate location.

A further complication in these systems involves the physical structure of the bracelet. Bracelets must be constructed to resist tampering. The device must be affixed to the particular individual so that the identity of that person can be assured when receiving the signal transmission. The device is cumbersome in order to prevent easy removal. In addition, each bracelet must have a self-contained power supply sufficient for operation over an extended time period.

U.S. Pat. No. 4,843,377 contemplates the use of a voiceprint as a means for remote identification of a prisoner. Audio spectral analysis is performed and applied to speech transmitted over a telephone line to determine a match with a probationer's voiceprint. Several commercially available systems are discussed.

While voice analysis may be a reliable means to determine the identity of an individual, such a system, in itself, cannot verify that the individual is at the prescribed location. Call forwarding, in the network or on the premises, can result in the appearance of a party being in the prescribed location, while in fact, being elsewhere.

DISCLOSURE OF THE INVENTION

Accordingly, an object of the invention is to provide a home incarceration system having the capability of remotely verifying the identity of an individual and the location of the individual at any time.

Another object of the invention is to provide a home incarceration system that is not subject to false indications of nonverification which may result from outside interference.

A further object of the invention is to enable remote monitoring of detainees in confinement without the necessity of a device that may be subject to physical tampering or breakdown.

Yet another object of the invention is to enable simultaneous, remote and automatic monitoring of a large number of confinees while requiring a minimum number of monitoring personnel. A related object is to provide an automatic warning or message to remote personnel in the event of a system determination that a confinee is absent from the required location.

A further object is to permit multiple legitimate sites of incarceration based, for example, on time of day or week and which can be easily verified by known telephone number.

An additional object of the invention is to provide a plurality of local control centers, each serving a home incarceration monitoring and control function for a prescribed geographical area and having the capability to selectively transfer the functions of any particular control center to another local center or a master network center for prescribed time periods.

The above and other objects of the invention are satisfied in part by providing a telephone communication network linking each confinement location to a remote home incarceration center. The system includes a controller and storage at the control center or at a remote location linked thereto. The system maintains a database of inmates currently included in the program. The prisoner database includes each inmate's name, telephone number of the site of incarceration, and date and period of incarceration. In the event that the inmate is permitted a work schedule, the database includes the telephone numbers of each permitted location and corresponding scheduled time periods.

When a new inmate is added to the system, the inmate is escorted to the incarceration location by civil authorities. Once there, telephone communication is established with the home incarceration center to establish an identity for the inmate. Voice training is undertaken to establish voice templates for the individual inmate. A variety of words are selected to form a test vocabulary. The words are recited by the inmate from the incarceration site and transmitted to the incarceration center where a voice template for each word is created and stored. This procedure avoids any detrimental influence resulting from variations in telephone transmission characteristics from different origins.

Once in the system database, and with the voice templates established, the inmate is subjected to periodic testing. Testing may be performed at predetermined schedules and at random intervals. A test is initiated by retrieving the inmate's number from the database and calling the incarceration site. An announcement is then made, requesting the inmate to call back in to the home incarceration center within a fixed time period to conduct the voice identification test. The system will be prepared to accept the incoming call. Caller line identification at the control center determines if the return call is made from the incarceration site. During the call, the inmate is required to recite a statement, prepared at the incarceration control center, including randomly chosen words from the template vocabulary. Comparison is made, using speech analysis, between the recited statement and the stored templates. As the statement is unknown to the inmate in advance, an attempt to use a voice recording as a response, with the inmate absent, would be futile.

The testing can be controlled manually at the incarceration center or be handled completely automatically. In an automated test procedure, the system would send notification, visibly or audibly, to an administrator of any test failures. Such notification may be transmitted through the network to the administrator at a location remote from the test center. A log file is maintained by the system for the purpose of recording all activity by the system, whether manually or automatically instituted.

The system can operate in the environment on one or more sites of the law enforcement authority premises on a dedicated line basis. Alternatively, a single system can be shared on a network basis by several law enforcement agencies by appropriate partitioning. An additional aspect of the invention is call forwarding control by one center to another for "after hours" monitoring or for other purposes.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
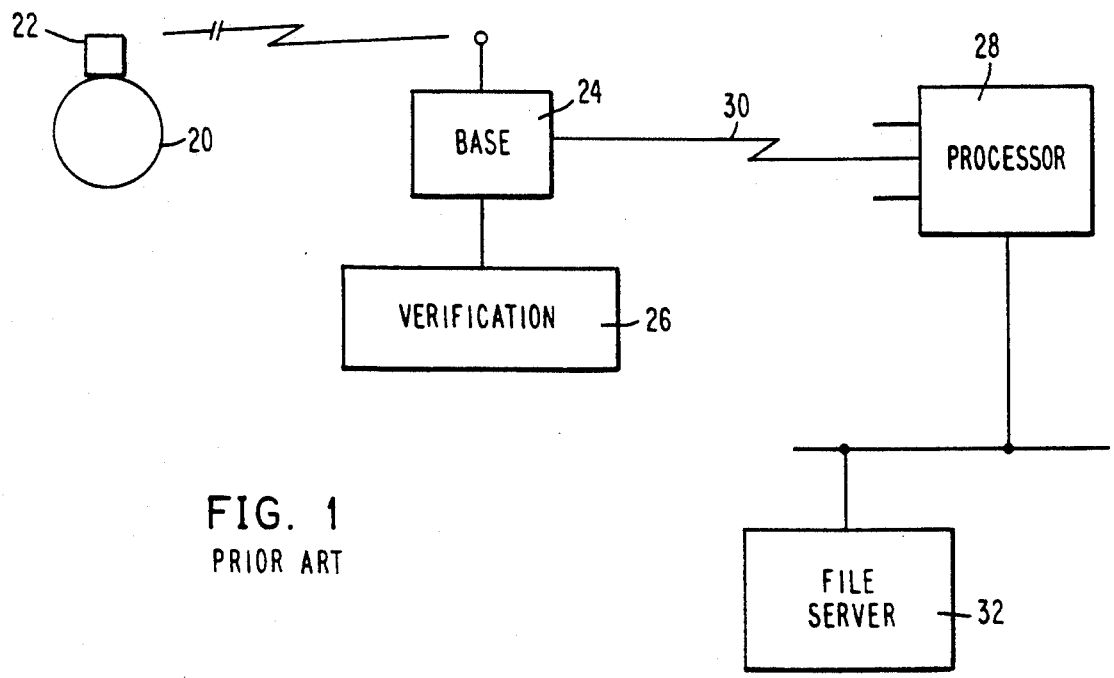
FIG. 1 is a block diagram illustrating a prior art monitoring system.
Figure 2:
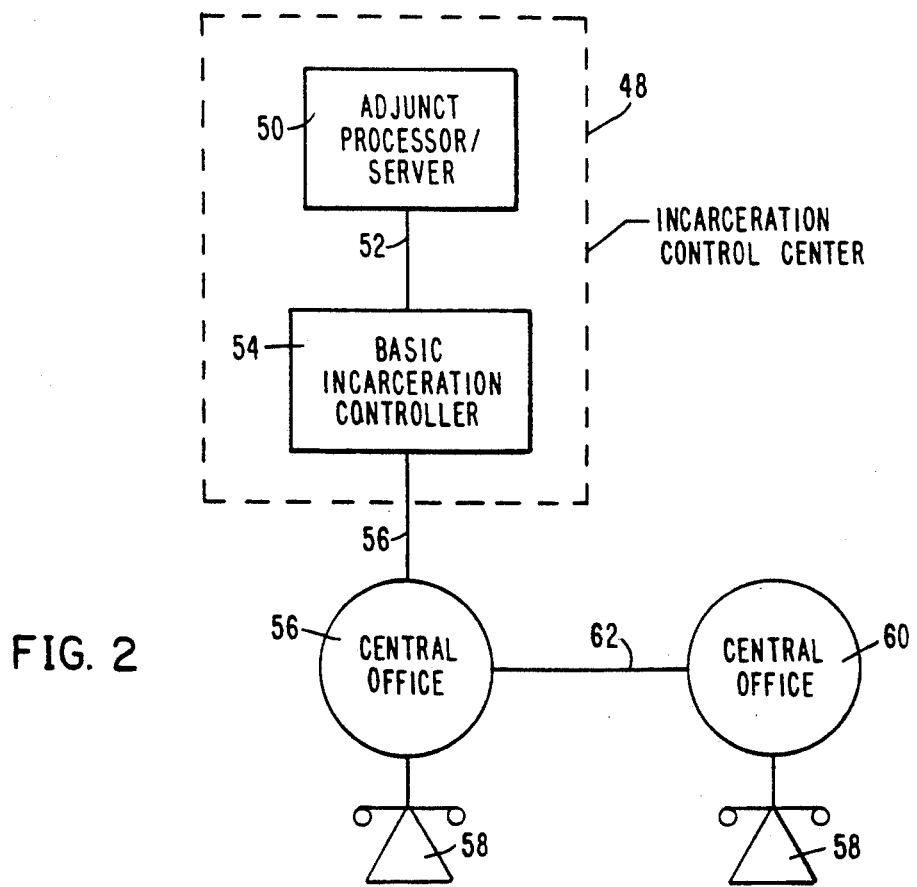
FIG. 2 is a block diagram of a system according to the present invention, depicting a network including a control office and controller within the network.

FIG. 2 broadly illustrates a home incarceration system including incarceration control center 48. An adjunct processor/server is shown at 50 interconnected through a network 52 to basic incarceration controllers 54, only one of which is represented in the figure for simplicity of illustration. Network 52 may be a local area network, such as ethernet, or a wide area network, such as a private line T1 network. The basic incarceration controller is shown connected, via telephone facilities (e.g., lines), to a central office 56, which is also connected via telephone lines to a particular local incarceration site 58. In addition to serving the area of central office 56, control center 48 may be extended to include additional central office areas such as the central office 60, shown connected therewith through interoffice facility line 62.

The basic incarceration controller includes telephone interfaces, a processor and voice processing/response capabilities, using appropriate hardware and software. The basic incarceration controller may also include storage for the inmate database and speech templates to perform all control functions as an independent unit. The system capacity can be extended beyond the limits of the basic incarceration controller by the adjunct processor/server, which includes memory storage and program control for the basic incarceration controller.

Figure 3:
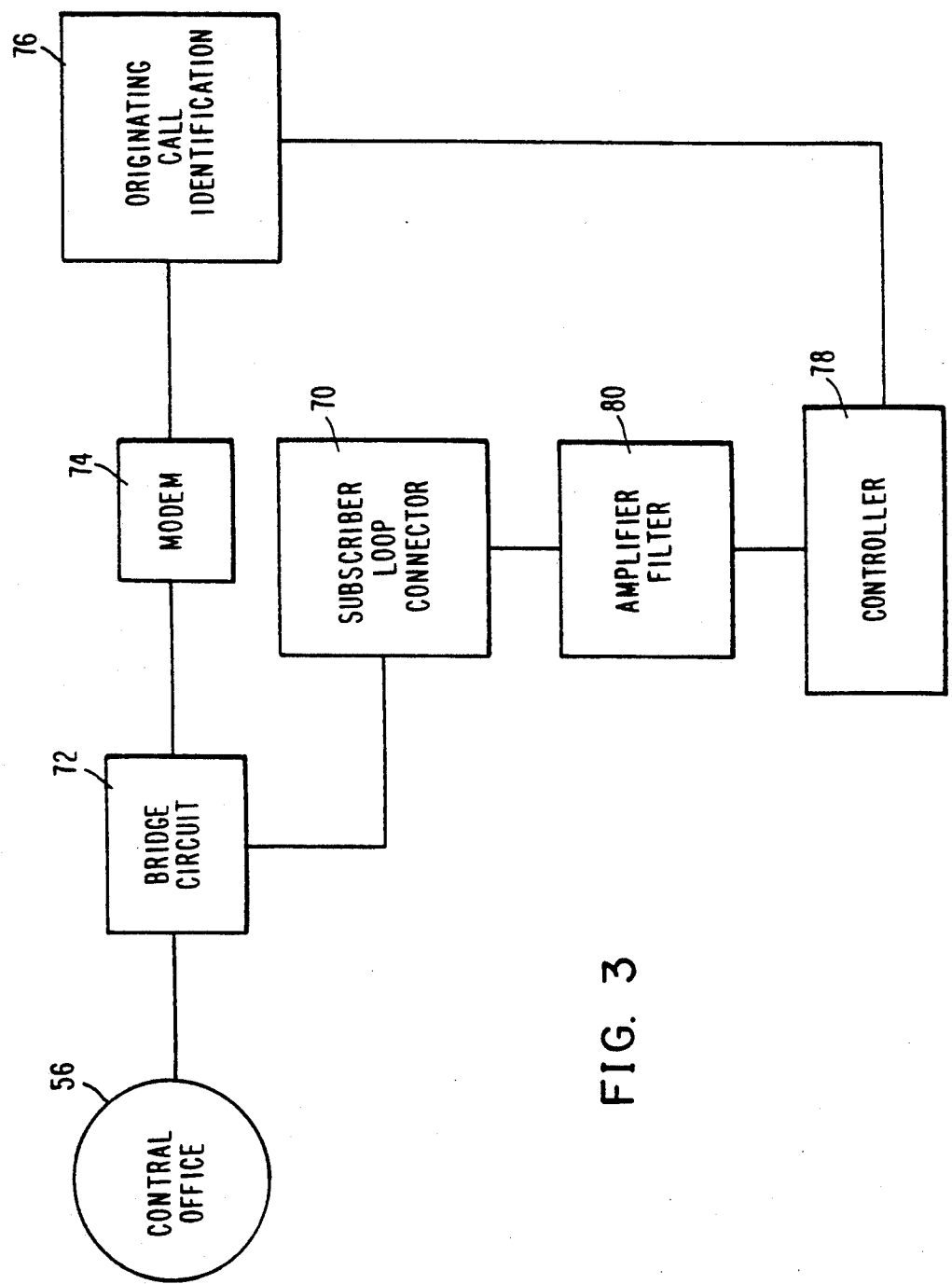
FIG. 3 is a block diagram according to the present invention, representing broadly the components of the system including the control functions.

FIG. 3 is a further development of the control elements of the system shown in connection with central office 56. The central office is connected to subscriber loop connector 70 and modem 74 through bridge circuit 72. Bridge circuit 72 allows an incoming call to be split, permitting the incoming call signals to be applied to the subscriber loop connector 70 and modem 74. The subscriber loop connector is connected to a communications port, not shown, in controller 78 through amplifier/filter circuit 80. The modem 74 is connected to an originating call identification device 76.

The subscriber loop connector is a well known unit that performs both incoming and outgoing call functions. This unit serves to control the telephone connection with the central office and user telephone line. For incoming calls, for example, the unit detects ringing, on-hook and off-hook. The unit, under direction of the controller, performs outgoing call functions. These functions, in an alternative embodiment, can be incorporated into an appropriate function board in the system microprocessor.

In operation, for incoming calls block 76 identifies the originating telephone number from information transmitted between the first and second ringing signals. A detailed description of the preferred composition of this device is contained in U.S. application Ser. No. 07/515,027, filed Apr. 26, 1990 which application is herein incorporated by reference. Alternatively, the functions of block 76 can be incorporated in the control program.

The subscriber loop connector establishes off-hook connection between the central office and the controller after the second ring. At this time the calling line has been identified by block 76 and this information is transmitted to the controller 78. The controller includes a processor for comparing the caller identification information with the stored database information associated with the inmates.

The processor also performs speech analysis, comparing the transmitted voice of the caller with stored voice templates. Speech and voice processing may be performed in accordance with technology well known in the art. Examples of suitable speech verification algorithms may be found in "Digital Processing of Speech Signals," by Rabiner and Schafer, Bell Laboratories, Prentice-Hall, Inc. 1978, particularly at page 457. Further description of voiceprint analysis for voice identification may be found in U.S. Pat. No. 3,525,811.

The filters and amplifiers forming block 80 condition the transmitted audio signals to limit the band width and strengthen the signals appropriately to the requirements of the processing to be performed in controller 78. Two way voice communication is transmitted between the incarceration site and the controller through the path including the central office, bridge circuit, subscriber loop connector, and amplifier/filter circuit.

Upon entering a new inmate into the system, a telephone call is established whereby "voice training" is performed. Voice templates of a selected word vocabulary are created and stored in the data base. The data base also includes the inmate's telephone number at home, work or other permitted location, scheduled hours at each permitted location, telephone number of probation officer or other official to notified in case of a violation, and any other pertinent information. The data base can be updated at any time without interrupting the calling activity of the system.

Testing is performed by calling the telephone at which the inmate is scheduled to be and requiring the inmate to call back to the control center. In the return call, the caller line is identified by block 76 and the inmate is required to repeat a statement including selected words from the template vocabulary. Verification of the caller's voice is made by comparison therewith with the stored templates, using voice analysis techniques described above. Dynamic adaptive updating of the templates may be periodically performed upon successful voice verification.

Calls may be placed by the control center on the basis of a predetermined schedule as well as randomly. The system has flexibility to determine frequency of random calls made per day and to change the frequency for each inmate as deemed appropriate. For example, inmates who have violated curfew might be assigned a higher frequency of random calls. In addition, inmates may be required to call in regularly at predetermined times.

Violations are reported automatically to administrative personnel by transmission of a message to a remote printer or terminal. Notification may also be effected by audible alarm, paging or delivery of a voice mail message. All activity is recorded in a log file maintained in the system.

The home incarceration monitoring scheme may include a continuous signalling device worn by the inmate as part of a hybrid system. This added redundancy would make the home incarceration concept more socially acceptable as well as afford continuous surveillance. During times in which broadcast transmission of the continuous signal is interrupted by interference or other instances in which no signal is received, the system can initiate a call to the inmate for verification by calling line identification and voice analysis.

Figure 4:
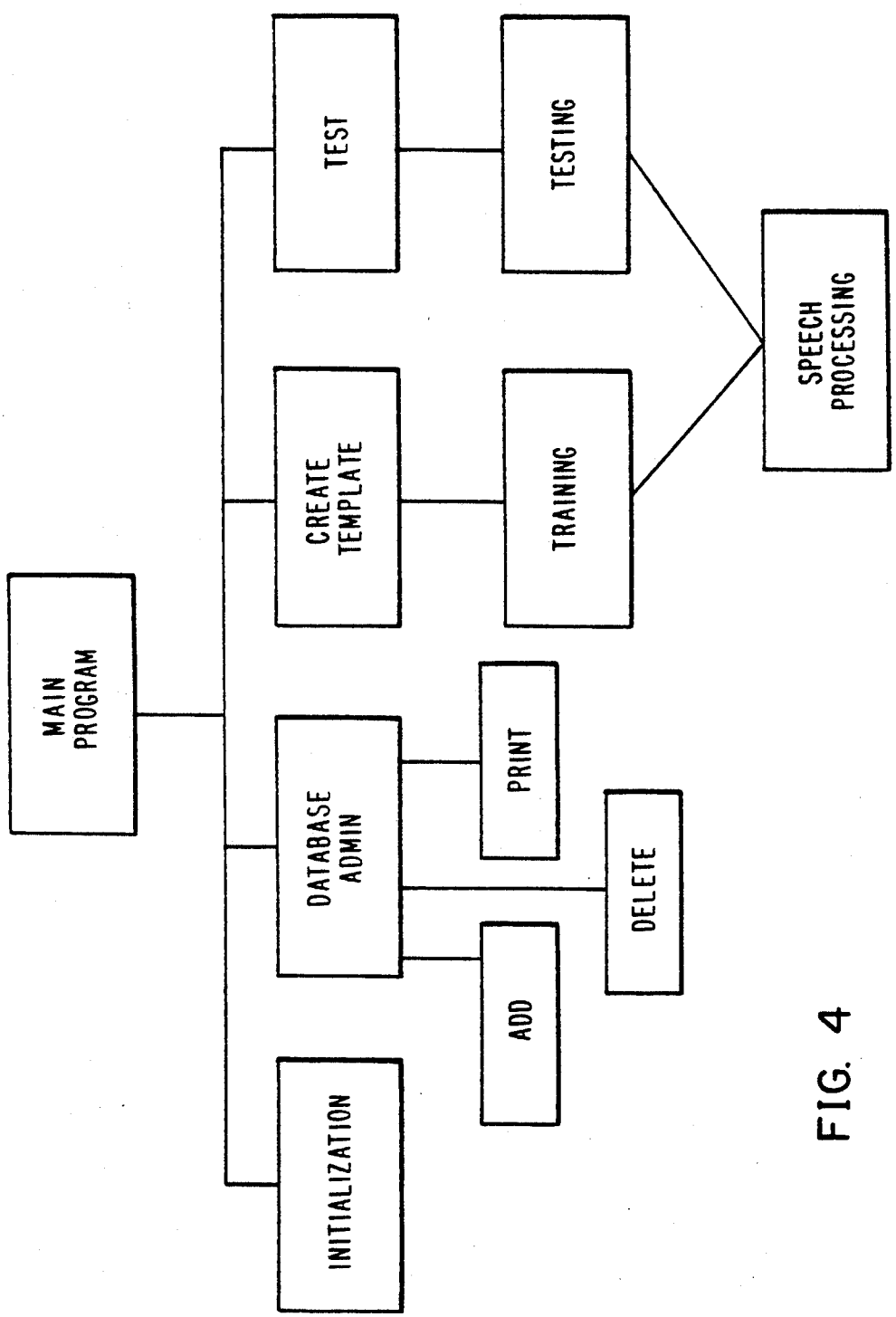
FIG. 4 is a function map of the home incarceration architecture of the present invention.
Figure 5:
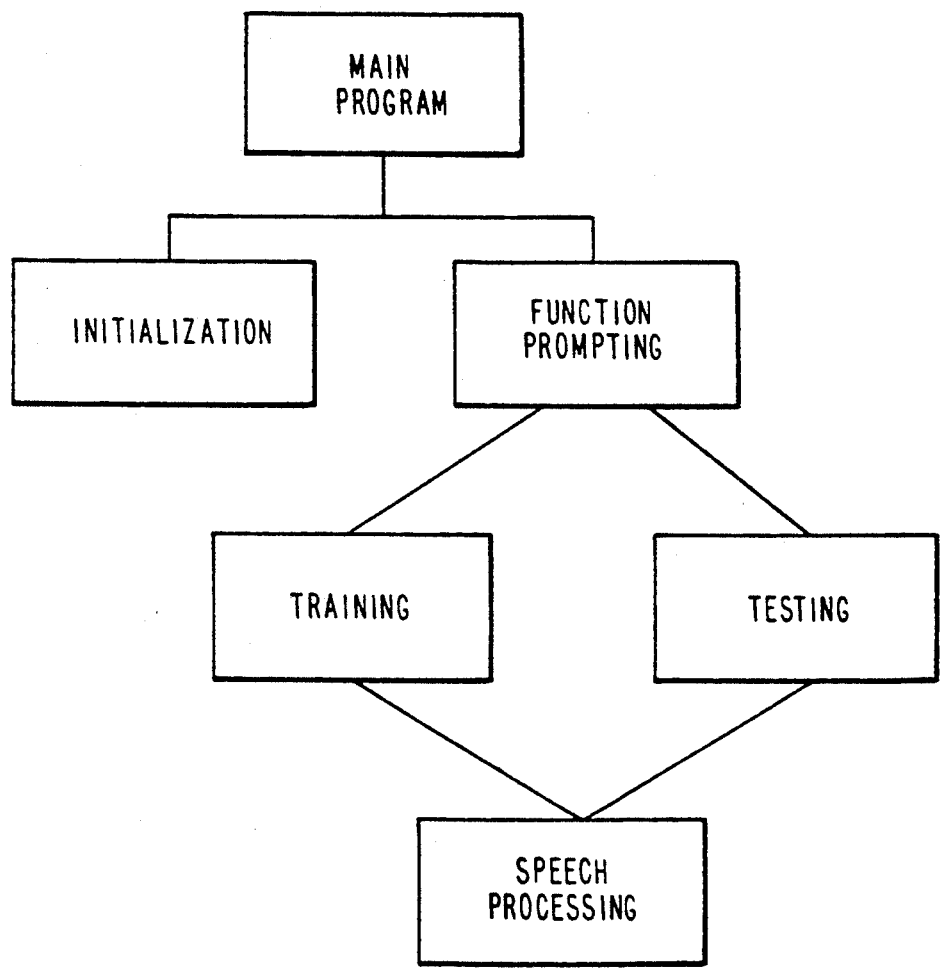
FIG. 5 is a function map of the speaker verification process of the present invention.

FIGS. 4 and 5 are charts illustrating the functions of the system including initialization, database administration, training and testing. These functions are under the control of a main program executed by the system processor. Database administration includes adding and deleting information, as well as a print capability. In FIG. 5, speech processing includes voice training to create templates and testing, using the templates and transmitted speech.

Calling party number identification may be obtained through ISDN or analog lines equipped with caller line identification or similar services. Number identification can also be transmitted using out of band signaling, packet switching or Simplified Message Service Interface (SMSI), ISDN primary rate access and bulk calling line identification. In some cases a trunk arrangement may be used in a PBX environment.

Figure 6:
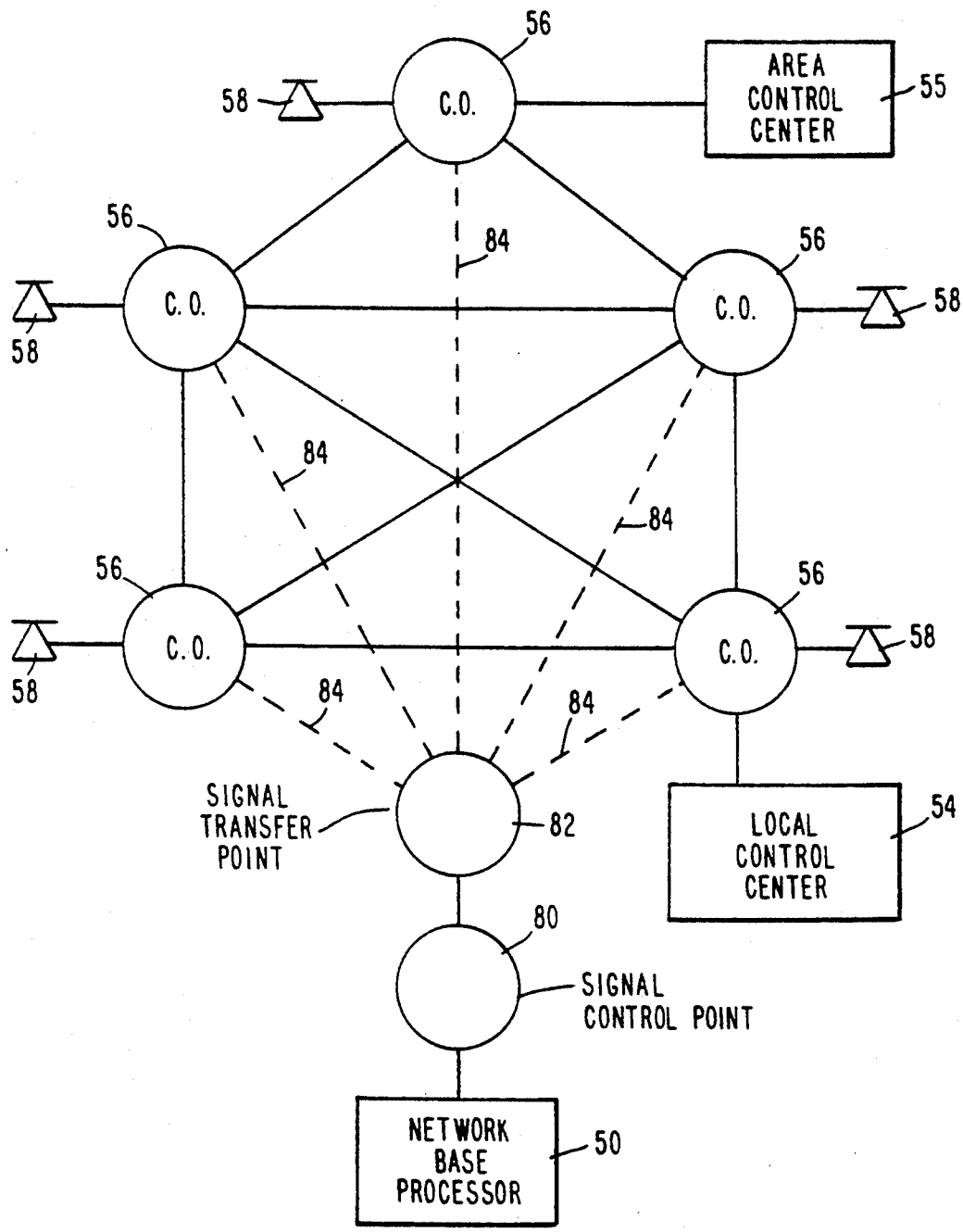
FIG. 6 is a network layout of the present invention, illustrating transfer capability among various geographically separated control centers.

FIG. 6 illustrates an intelligent network application of the home incarceration service. Central offices 56, each serving end user incarceration sites 58, are shown interconnected with each other. A local control center 54 may be customer premises equipment or network based and can perform voice verification and caller party number identification. Similarly, a larger area control center, which may be customer premises equipment or network based, is shown at 55.

Sufficient hardware and software to serve the entire system is provided at network base processor 50, which may be used in conjunction with signal control point 80. The signal control point is attached to the network through signal transfer point 82 to monitor all signaling within the network and to intelligently control the action to taken based on the signal. Additional signal transfer points may be included to accommodate network size.

The signal transfer point is connected to each of the central offices through SS7 or other data links for database information transfer. The local control center may be operational for limited hours. Transfer of the functions of this center for after hours coverage can be made to the area control center under control of the network base processor via the signal transfer point or by call forwarding from the local office.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A method for remotely verifying, at a verification site, the attendance of a particular person at a predetermined area, said area being provided with a telephone, comprising the steps of:
   establishing an on line telephone connection between said verification site and said telephone;
   determining a voice characteristic of said person at said verification site in response to speech transmission through said telephone connection; and
   testing for the presence of said person at said area, said step of testing comprising the steps of:
   identifying a calling telephone line directory number in response to an incoming telephone call;
   establishing an on line connection for said incoming telephone call; and
   analyzing a voice transmitted during said incoming call.

2. A method as recited in claim 1, wherein said step of testing further comprises a step of determining whether the identified telephone line directory number corresponds to a predetermined line directory number associated with said telephone.

3. A method as recited in claim 2, wherein said step of testing is selectively performed at random times and further comprises:
   calling said telephone from said verification site;
   establishing a further on line connection between said verification site and said telephone;
   requiring a return call from said telephone to said verification site within a set time period after termination of said further on line connection; and
   determining whether a return call has been established within said set time period.

4. A method as recited in claim 3, further comprising the step of generating a warning indication upon determination that a return call has not been established within said set time period.

5. A method as recited in claim 2, wherein said step of determining a voice characteristic comprises:
   selecting a plurality of words to form a voice vocabulary;
   creating a voice template for each word of said vocabulary as spoken by said person in said speech transmission; and
   storing the templates created.

6. A method as recited in claim 5, wherein said step of testing further comprises:
   preparing a statement containing one or more words included in said vocabulary; and
   requiring the caller of said incoming call to recite said statement;
   and said step of analyzing comprises comparing the recited statement with the stored templates.

7. A method as recited in claim 6, wherein said step of determining a voice characteristic further comprises dynamically updating the stored templates.

8. A method as recited in claim 6, further including the step of generating a warning indication upon a condition that either said identified telephone line does not correspond to a line associated with said telephone or that the voice transmitted during said incoming call does not match said stored templates.

9. A method as recited in claim 8, wherein said generating step comprises displaying a message on a terminal.

10. A method as recited in claim 9, wherein said terminal is remote from said verification site.

11. A method as recited in claim 8, wherein said generating step comprises printing out a message.

12. A method as recited in claim 8, wherein said generating step comprises transmitting a warning message.

13. A method as recited in claim 12, wherein said message is a paging communication.

14. A method as recited in claim 12, wherein said message is a voice mail message.

15. A method as recited in claim 12, wherein said warning message comprises an audible alarm.

16. A method as recited in claim 12, wherein said step of transmitting a warning message comprises automatically generating a radio dispatch to a patrol vehicle.

17. A method as recited in claim 6, further comprising storing results of the tests performed.

18. A system for monitoring at one or more remote locations the presence or absence of a particular person within a defined area comprising:
   a telephone at said defined area;
   verification means remote from said area for verifying the identity of an individual at said area; and
   a communications network for establishing communication between said telephone and said verification means;
   said verification means comprising:
   voice processing means for analyzing an incoming voice transmission from said communications network; and
   caller line directory number identification means for identifying an incoming caller telephone line.

19. A system as recited in claim 18, wherein said voice processing means comprises:
means for creating voice templates of a preselected word vocabulary for said person;
means for storing said voice templates; and
means for comparing spoken words of said voice transmission with said voice templates.

20. A system as recited in claim 18, wherein said verification means further comprises storage means for storing information including identification of said telephone line directory number as a reference for comparison with incoming caller line directory number identification whereby origination of an incoming call from said area may be verified.

21. A system as recited in claim 18, wherein said verification means further comprises means for generating a warning indication if said incoming caller line directory number identification does not correspond to said stored telephone line directory number identification or if said spoken words of said voice transmission does not match the stored voice templates.

22. A system as recited in claim 21, wherein said means for generating includes a display terminal.

23. A system as recited in claim 21, wherein said means for generating includes a printer.

24. A system as recited in claim 20, including two or more telephones at geographically separated locations within said defined area, said storing means including stored identification of each of said telephones.

25. A system as recited in claim 18, including a plurality of said verification means connected to said communications network at separated locations, each of said verification means capable of monitoring a plurality of identified persons at various locations within a distinctly defined area.

26. A system as recited in claim 25, wherein said communications network comprises a plurality of signal transfer points and call forward means for transferring verification operation from one of said verification means to another of said verification means through a signal transfer point in said network.

27. A system as recited in claim 18, further including means affixed to said person for transmitting a continuous signal and means for monitoring said continuous signal.

* * * * *